(12) United States Patent
Ballester

(10) Patent No.: US 8,213,550 B2
(45) Date of Patent: Jul. 3, 2012

(54) WIDEBAND DIGITAL RECEIVER WITH INTEGRATED DYNAMIC NARROWBAND CHANNELIZATION AND ANALYSIS

(75) Inventor: Patrick Ballester, Candor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 594 days.

(21) Appl. No.: 12/409,414

(22) Filed: Mar. 23, 2009

(65) Prior Publication Data

US 2010/0239052 A1    Sep. 23, 2010

(51) Int. Cl.
*H04L 27/06* (2006.01)

(52) U.S. Cl. .................................... 375/340; 375/316

(58) Field of Classification Search .................. 375/316, 375/320, 324, 340, 350; 333/166–167, 173; 329/315, 316, 327, 347, 363
See application file for complete search history.

(56) References Cited

U.S. PATENT DOCUMENTS

| | | | | |
|---|---|---|---|---|
| 5,357,256 A | * | 10/1994 | Peperone | 342/160 |
| 5,396,520 A | * | 3/1995 | Degges | 375/316 |
| 6,477,196 B1 | * | 11/2002 | Swanke et al. | 375/147 |
| 6,622,044 B2 | * | 9/2003 | Bange et al. | 607/27 |
| 6,792,057 B2 | * | 9/2004 | Kabel et al. | 375/346 |
| 7,623,890 B2 | * | 11/2009 | Nagano et al. | 455/553.1 |
| 2004/0196928 A1 | * | 10/2004 | Hessel | 375/340 |
| 2006/0215795 A1 | * | 9/2006 | Nafie et al. | 375/346 |
| 2007/0086547 A1 | * | 4/2007 | Sobchak et al. | 375/345 |
| 2009/0047920 A1 | * | 2/2009 | Livsics et al. | 455/226.1 |

* cited by examiner

*Primary Examiner* — Lawrence B Williams
(74) *Attorney, Agent, or Firm* — Wolf, Greenfield & Sacks, P.C.

(57) ABSTRACT

Wideband digital receiver with integrated dynamic narrowband channelization and analysis. Signals received in a wide band are channelized into a plurality of narrower band channels within the wide band and input into a programmable narrowband filter. A set of descriptors is formed, each corresponding to an associated output signal of each of the channels. The descriptors are analyzed to determine if further processing is warranted. For each descriptor warranting further processing, one or more corresponding analysis algorithms is/are selected from a library of available analysis algorithms. The programmable narrowband filter is adjusted and a new descriptor is formed of its output. The initial set of descriptors is augmented with the new descriptor. The new descriptor is analyzed to determine if further processing of received signals is warranted.

11 Claims, 12 Drawing Sheets

Fig. 9

| Name | Function |
|---|---|
| Entry Number | Index into the Re-acquisition/Trigger table table |
| Valid Entry | Indicates whether this entry is valid |
| Re-Acquisition | Boolean indicating this entry reflects a previously detected signal |
| Re-Acquisition Signal | If Re-Acquisition is true, the index of the previously detected signal (emitter) that is associated with this entry. Any PDW that matches this entry will have this number appended to the acquisition PDW. |
| Trigger | Boolean indicating that an analysis is required |
| Center Frequency | Tune frequency of digital down converter |
| Tune to PDW frequency | A Boolean that indicates the digital down converter should be tuned to the measured RF of the PDW associated with the match. This overrides the Center Frequency field above |
| Detection Filter Coefficients | A table of coefficients that will be used to configure the digital detection filter characteristics |
| Detection Thresholding | A table that configures the detection criteria for detection: Amplitude threshold, minimum PW, sample limits, etc |
| Algorithm Index | An index that will be used to select the analysis algorithm that will process the detected I/Q data. |
| Priority | An integer that indicates the relative priority of this analysis with respect to the priorities of other analysis entries |
| Termination Time Limit | The analysis will be terminated after running for this amount of time |
| Termination Pulse Count | The analysis will be terminated after this pulse count is exceeded |
| Pre-detection I/Q Sample Count | The amount of I/Q samples that will be collected prior to the crossing of detection threshold |
| Post-detection I/Q Sample Count | The amount of I/Q samples that will be collected after the signal goes below detection threshold |
| Store Gated I/Q | Indicates that the gated I/Q associated with the signal will be stored for later retrieval |
| Status | Indicates status of analysis: none, in-process, waiting, pre-empted, completed |

WIDEBAND DIGITAL RECEIVER WITH INTEGRATED DYNAMIC NARROWBAND CHANNELIZATION AND ANALYSIS

TECHNICAL FIELD

Aspects of this invention relate to the receiving, detection and classification of electromagnetic signals which may be received within a wide range of frequencies, in a so-called wideband receiver.

BACKGROUND

In a variety of circumstances, a wideband radio receiver may be employed to detect transmissions of signals within a wide (large) band of frequencies, such signals typically each having a bandwidth that is much narrower than the wide band. For example, it may be known that, or desired to detect whether, a signal or signals of narrow bandwidth, such as a carrier at any of a large number of possible frequencies, is or are being broadcast. Some or all of the potential carrier frequencies may be known, or all or some potential signals may be known, only to lie somewhere in a broad range of frequencies. Typically, wideband acquisition is used to detect the presence of such signals of interest. Then, narrowband acquisition and/or analysis techniques are used to isolate the signal (s) of interest from background or interfering signals (e.g., to improve the receiver's signal-to-noise ratio), and/or to configure an analysis receiver (often having a fixed bandwidth) to collect additional information such as to perform modulation detection/analysis and signal feature extractions from the detected transmissions. Thus, it may be desired to know when, or that, a signal is being broadcast within the wide band, and then to analyze and identify such signals as to their type, source, and/or content. Subsequently, analysis can determine whether a detected signal is new or was previously identified.

Various approaches have been used to accommodate narrowband detection within wide frequency ranges. For example, full digital narrowband channelization of a wide signal band may be implemented with a bank of digital filters to provide for the simultaneous filtering and detection of signals contained within different frequency sub-regions within the wide band. A wide detection band provides high probability of intercept, while the narrowband channelization filters provide for relatively higher sensitivity and system selectivity. Unfortunately, implementation of a large number of narrowband channels over a wide frequency range often requires a very large, perhaps even an excessive, number of digital filters, thus increasing the digital hardware, system size, power consumed and, sometimes, time required to implement the detection and analysis functions. This approach can be particularly inefficient when much of the wideband spectrum may contain few signals of interest or when signals are unevenly distributed.

Alternatively, the use of two receivers, namely a wideband channelizer/receiver and a separate, tunable narrowband channelizer/receiver, may be employed. The narrowband receiver is cued and tuned to a signal of interest only after a processor has processed the detected signals (often pulses) from the wideband channelizer. The latency (i.e., time consumed) to detect the pulses within the wideband window using the wideband channelizer and to then tune and configure the narrowband receiver can result in missing all or most of the opportunity to analyze (or even detect) fleeting emissions (i.e., signals from transmitters active only for short intervals, such as to send a quick, non-repeating pulse or burst of pulses). The separate narrowband analysis receiver also requires additional space and power, though generally less space and power than the plurality of narrowband receivers of the aforementioned type of system.

In another configuration, one or more fixed (rather than tunable) narrowband filters may be contained within a wideband channelizer/receiver. Each such narrowband filter may have a fixed bandwidth and frequency, and each narrowband filter typically has its own signal detection circuitry. Consequently, the wideband receiver must be re-tuned once a signal is detected in order to place the detected signal within the, or a, narrowband channel.

A need thus exists for an improved wideband receiver, preferably one in which by comparison with such prior approaches, requires less power. It is also preferable that it acquire signals quickly, to facilitate their analysis.

SUMMARY

The appended claims define the invention with particularity and it is not the intention to here in any way suggest the invention be understood in any way other than as defined in those claims. Indeed, it will be appreciated that the claims define various aspects of the invention that may be practiced separately or together, and that the claims cover embodiments that as a general rule may be practiced either independently or together, as circumstances permit. Thus, there is no general intention that embodiments are mutually exclusive though in some instances that may be the situation. Further, the independent claims contain different limitations and different combinations of limitations. Accordingly, no reference to "the invention" or "the present invention" is intended to refer to all claimed subject matter.

Thus, there will be shown below methods and apparatus (systems) for processing signals which may be present in a first, wide band of frequencies, to characterize and identify the emitters of those signals, and multiple embodiments of systems for practicing those methods. Such methods and systems are shown using both hardware and software for processing, and using both analog and digital wideband IF signal processing. The inventive concepts permit power savings and high speeds of signal characterization.

Thus, among other aspects included within the inventive concepts is an example method for processing received electromagnetic signals which may be present in a first, wide band of frequencies comprises down-converting said received signals to an intermediate frequency band; channelizing signals in the intermediate frequency band into a plurality of narrower band channels within said intermediate frequency band; inputting the intermediate frequency signals into a programmable narrowband filter; forming a set of original descriptors, with each original descriptor corresponding to an associated output signal of each of the plurality of channels and characterizing said output signal; storing the set of original descriptors in a computer-readable memory; in a processor, analyzing each original descriptor to determine if further processing is warranted according to predetermined criteria; for each original descriptor warranting further processing, selecting one or more corresponding analysis methods from a library of available analysis methods;—based at least in part on the selected analysis methods, adjusting the programming of the programmable narrowband filter and forming a new descriptor of its output; and augmenting a corresponding stored original descriptor in said memory with the new descriptor, to form an augmented descriptor.

Such a method may further comprise analyzing the augmented descriptor to determine if a received signal should be further processed. The augmented descriptor also may be analyzed to identify, if possible, a corresponding signal emitter.

Another aspect of the inventive concepts is an example system for processing electromagnetic signals which may be present in a first, wide band of frequencies. Such a system may comprise a programmable channelizer having a plurality of relatively narrow-band channels, each said channel passing signals only in a narrow pass band disposed within said wide band, the channelizer receiving a representation of the signals received within the wide band of frequencies and each channel providing an output corresponding to input signals received within its pass band; a signal detection and parameter measurement module providing, responsive to the channelizer outputs, a set of descriptors, with each descriptor corresponding to an associated output signal of each of the plurality of channels and characterizing said channel's output signal; a signal comparison table configured to store descriptor entries along with indications of analysis methods to be applied to signals corresponding to said descriptor; a parameter signal processor operatively connected to analyze each descriptor of a received signal to determine if further processing of the signal is warranted according to predetermined criteria and for each signal warranting further processing, selecting one or more corresponding analysis methods to be applied to the signal corresponding to said descriptor; one or more dynamic analysis channels, each generating analysis signal descriptors for signals analyzed within the passband of a programmable narrowband filter, and including a dynamic analysis control module configured, based at least in part on the selected analysis methods, to adjust the programmable narrowband filter; and a processor configured to augment descriptor entries in the signal comparison table with information from analysis signal descriptors. An emitter signal processing module may be included which analyzes said augmented descriptor entries to identify, if possible, a corresponding signal emitter. The analysis methods applied to the descriptor may be selected from a library of available analysis methods.

Another aspect is a receiver system for detecting and processing electromagnetic signals which may be present in a first, wide band of frequencies, comprising a front end subsystem which down-converts received signals in said wide band to an intermediate frequency band; an analog-to-digital converter operatively connected to the front end to produce digital samples of signals in the intermediate frequency band; a first hardware processor which receives said digital samples and is adapted to provide one or more dynamic analysis channels, each having at least one programmable narrowband filters and generating analysis signal descriptors for signals analyzed within the passband of each said programmable narrowband filter, and including a dynamic analysis control module configured, based at least in part on the selected analysis methods, to adjust the programmable narrowband filter; a programmable channelizer having a plurality of relatively narrow-band channels, each said channel passing signals only in a narrow pass band disposed within said intermediate frequency band, the channelizer receiving an intermediate frequency representation of the signals received and each channel providing an output corresponding to intermediate frequency signals within its pass band; means for obtaining signal measurements on signals output from said channels; a second hardware processor adapted to provide (i) a signal detection and parameter measurement module providing, responsive to the channelizer outputs, a set of descriptors, with each descriptor corresponding to an associated output signal of each of the plurality of channels and characterizing said channel's output signal, and (ii) a signal comparison table configured to store descriptor entries along with indications of analysis methods to be applied to signals corresponding to said descriptor; and one of said processors further being configured to augment descriptor entries in the signal comparison table with information from analysis signal descriptors. Each of the first and second hardware processors may be embodied in an application-specific integrated circuit or a field-programmable gate array. In some embodiments, the system may further include an anti-aliasing filter, the analog-to-digital converter being operatively connected to the front end through the anti-aliasing filter. In some embodiments, the digital samples are also provided to the second hardware processor and the second hardware processor embodies the programmable channelizer and the means for obtaining signal measurements on signals output from said channels. The system may further include an emitter signal processing module which analyzes said augmented descriptor entries to identify, if possible, a corresponding signal emitter.

As a practical matter, the examples shown all rely upon down-converting received signals in a wide band and performing all subsequent processing in an intermediate frequency range. It should be appreciated, however, that in theory all of the methods and systems herein discussed may directly process received signals without down-converting, providing components are available to perform the required tasks at the received frequencies.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9 is an example of a re-acquisition/trigger table and/or dynamic analysis field entries that could be utilized in embodiments of the systems and methods shown herein.

DETAILED DESCRIPTION

Figure 1:
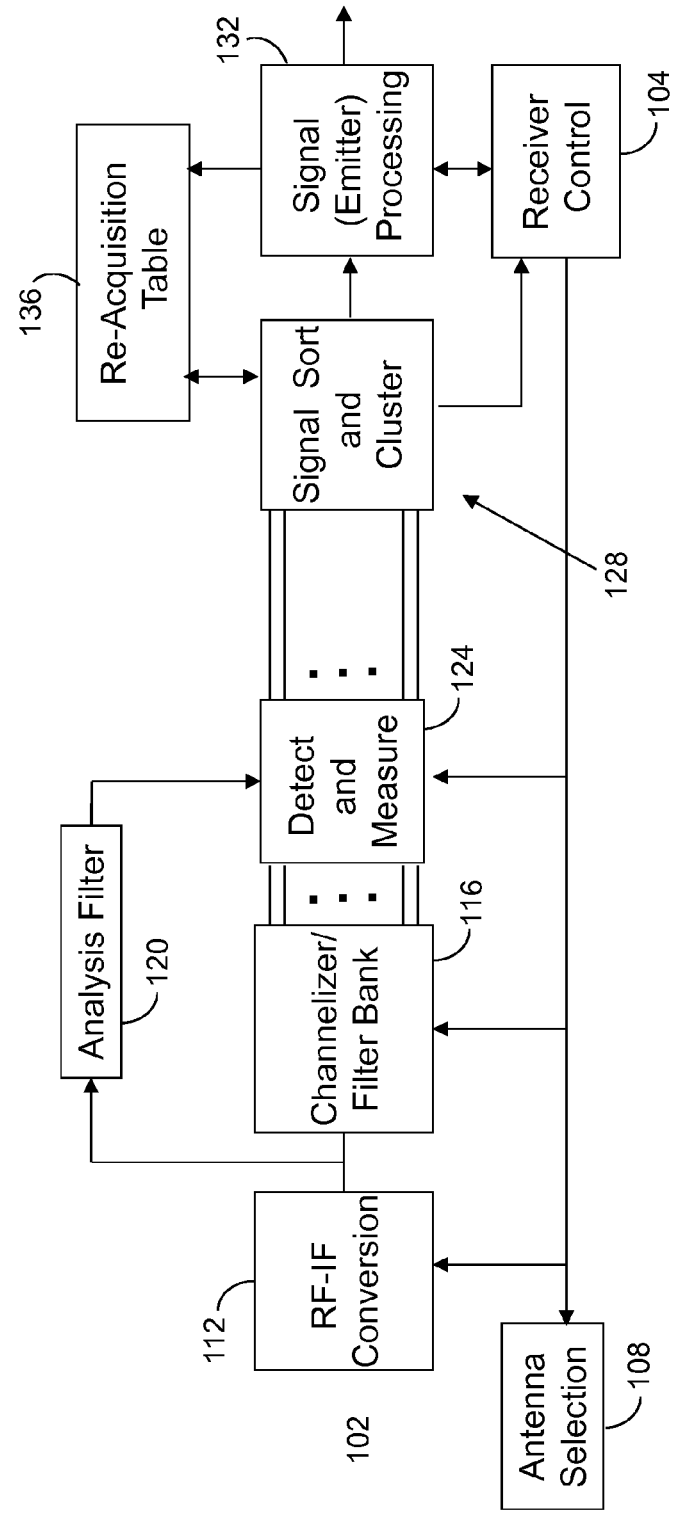
FIG. 1 is a part hardware, part functional block diagram of one type of prior-art wideband signal acquisition system.

In some prior art implementations of wideband signal acquisition (FIG. 1), a receiver 100 may be used to monitor a wide frequency range for signals of interest. Such signals may be acquired by any suitable means (e.g., via one or more antennas 102 selected by an antenna selection or switching subsystem 108) and delivered into a receiver front end 112 which typically converts received radio frequency (RF) signals to an intermediate frequency (IF) for processing. For example, the front end may receive signals over a wide band and the front end may downconvert them to an IF at a much lower frequency, to facilitate further processing. A channelizer 116 (e.g., a filter bank and suitable controls) may be used to isolate and further analyze any signals of interest at the IF. The channelizer's range may, however, be limited to a small portion or block of the monitored wide frequency range. Consequently, the receiver would need to be retuned, frequency block by frequency block, in order for the channelizer 116 to accommodate the entire range of the covered bandwidth. For this purpose, a receiver control module 104 would typically be used to provide control signals to adjust the channelizer and, if necessary, the front end, to step-wise cover the entire frequency range of interest.

In addition to the channelizer 116, an additional fixed narrowband analysis filter 120 may be employed to filter the output of the front end in parallel with the channelizer. For simplicity, only a single analysis filter is depicted, but any number of analysis filters may be used. Such an analysis filter 120 may be useful in cases where a signal of interest may be detected by the channelizer 116, but the signal spills over into multiple adjacent channel bins, resulting in less-than optimal or inaccurate signal measurements. In these instances, if an analysis filter is used which has a passband wider than a single channel—e.g., two channels wide, centered on the center of a channel, an additional retuning of the receiver may be done in order to center analysis filter 120 on the desired signal. Then, the analysis filter 120 can obtain an adequate measurement of that signal and the output of the analysis filter may be used instead of that of the channelizer.

For example, in FIG. 1, a front end 112 is monitoring a predetermined wide frequency range. Often this is less than the entire frequency range to be monitored, so the band observed by the front end is moved, block by block, across the spectrum, where the block sizes are determined at least in part by the limitations of the channelizer/filter bank 116. For each adjacent segment of the IF signal at its input, the channelizer 116 provides a corresponding output so that it has multiple outputs (e.g., one per channel) in parallel. The analysis filter 120 may be used concurrently with channelizer 116 to provide additional information about signals observed in one or more of the channels.

Each output of channelizer 116 and/or analysis filter 120 has a "detect and measure" algorithm 124 applied to it. Such algorithms, which are known to those skilled in the art, include, but are not limited to, algorithms for determining whether any energy is present in the channel, and if so, measuring at least its basic characteristics (e.g., its frequency, amplitude). Such algorithms can be implemented in any suitable way (e.g., via software or hardware or a combination). Preferably, the signal processing is performed in the digital domain. Next, for each signal found by the detect and measure algorithm, a descriptor (also called a signal descriptor word, or SDW) is formed by the detect and measure module 124. A descriptor is a structured information packet which indicates a detected and measured set of attributes of the received signal. Typically, such a packet may comprise one or more digital words with each word having specific bits assigned to convey specific kinds of information. (Information in a descriptor also may be "tagged" with labels identifying the nature of the information.) The specifics of descriptors are up to the designer and the specifics of a descriptor data structure—e.g., its fields and the like—is in no way a limiting aspect of the prior art or of this invention.

Next, each descriptor is analyzed through the application of appropriate signal sorting and clustering algorithms, in a signal sort and cluster module 128. These algorithms attempt to organize or sort and group the signals based on their descriptor content, in a meaningful way that is a choice of the designer. In some embodiments, for example, signals may first be sorted by frequency. Then, by looking at the groups of descriptors at each observed frequency, a determination might be made as to whether those associated signals were emitted from one or more sources at that frequency, such as by considering which antenna or antennas provided the signal, and at what power level. Through a clustering analysis, it might be concluded that two signals either did or did not emanate from the same transmitter.

After such sorting and clustering of descriptors have been achieved, this information is then sent to an emitter processing module 132, where an algorithm(s) determines what types of signals have been observed and their characteristics (e.g., one signal is an air traffic control radar signal, one is a weather radar signal and another is a data signal from a microwave data relay).

Emitter processing module 132 may then compare or add these findings to entries in a re-acquisition table 136 in a memory (not shown). Entries in such a re-acquisition table 136 may consist of earmarked descriptor types and/or trigger conditions that when detected induce either a re-examination of a signal (e.g., via a minor retuning of the receiver by receiver control 104, or a switching of antennas to effect a second reception for comparison) or retuning to "move on" entirely to the next segment of the wide frequency range to be monitored.

For example, by reference to the re-acquisition table 136, emitter processing module 132 may determine that a descriptor possibly identifies a signal source that has been observed before and thus warrants further analysis for confirmation. Such further analysis might be as simple as switching antennas to confirm the direction of the transmitter. The emitter processing module 132 would then instruct the receiver control 104 to select the appropriate antenna configuration for antenna selection module 108. Another type of further analysis which might be performed alone or in conjunction with switching antennas would be to retune the front end of the receiver 112 to re-center the analysis filter 120 and reanalyze the signal.

A concern that can arise from such prior-art implementations of wideband signal acquisition is the latency that is incurred due to the need to retune the receiver. Such receiver retuning is a relatively slow process and can result in desired signals and their associated information being "lost" by the time retuning has occurred. For example, a detected signal of interest might no longer be transmitting once the retuning is done to center the analysis filter. Or, other potential signals of interest could be lost in "other blocks" of the monitored wide frequency range as the channelizer is "stuck" in a particular block, perhaps retuning the analysis filter or itself being retuned to the next block.

I have appreciated that one can, instead, configure a receiver to provide wideband acquisition (with associated wideband channelization) with portions of the wideband channel covered by dynamically controllable narrowband channelization and/or fixed analysis channels.

Figure 2:
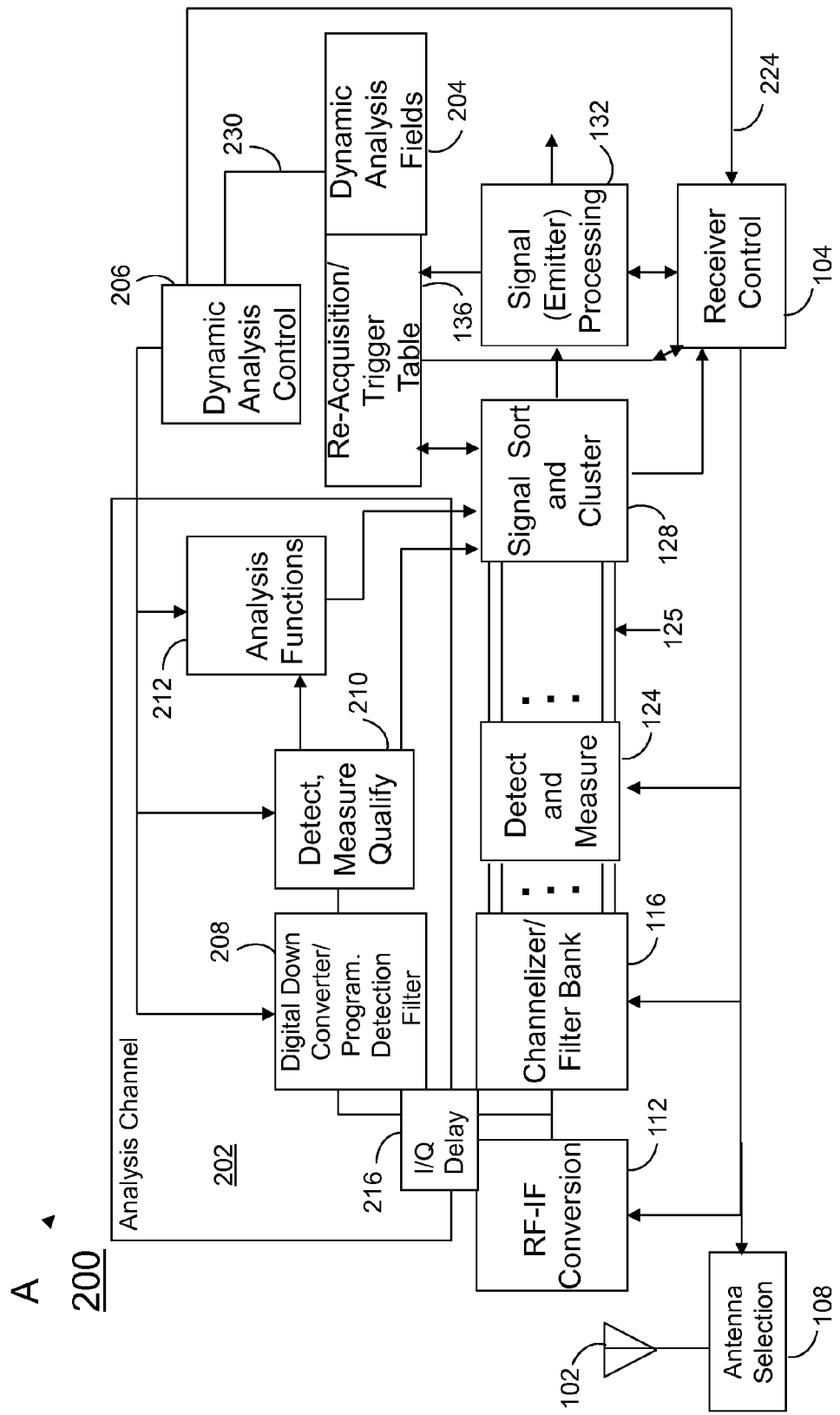
FIG. 2A is a functional block diagram of an example implementation of a wideband signal acquisition system with dynamically controllable narrowband channelization, according to some embodiments taught herein.
FIG. 2B is another functional block diagram of an example implementation of a wideband signal acquisition system with dynamically controllable narrowband channelization, according to some embodiments taught herein.
Figure 2:
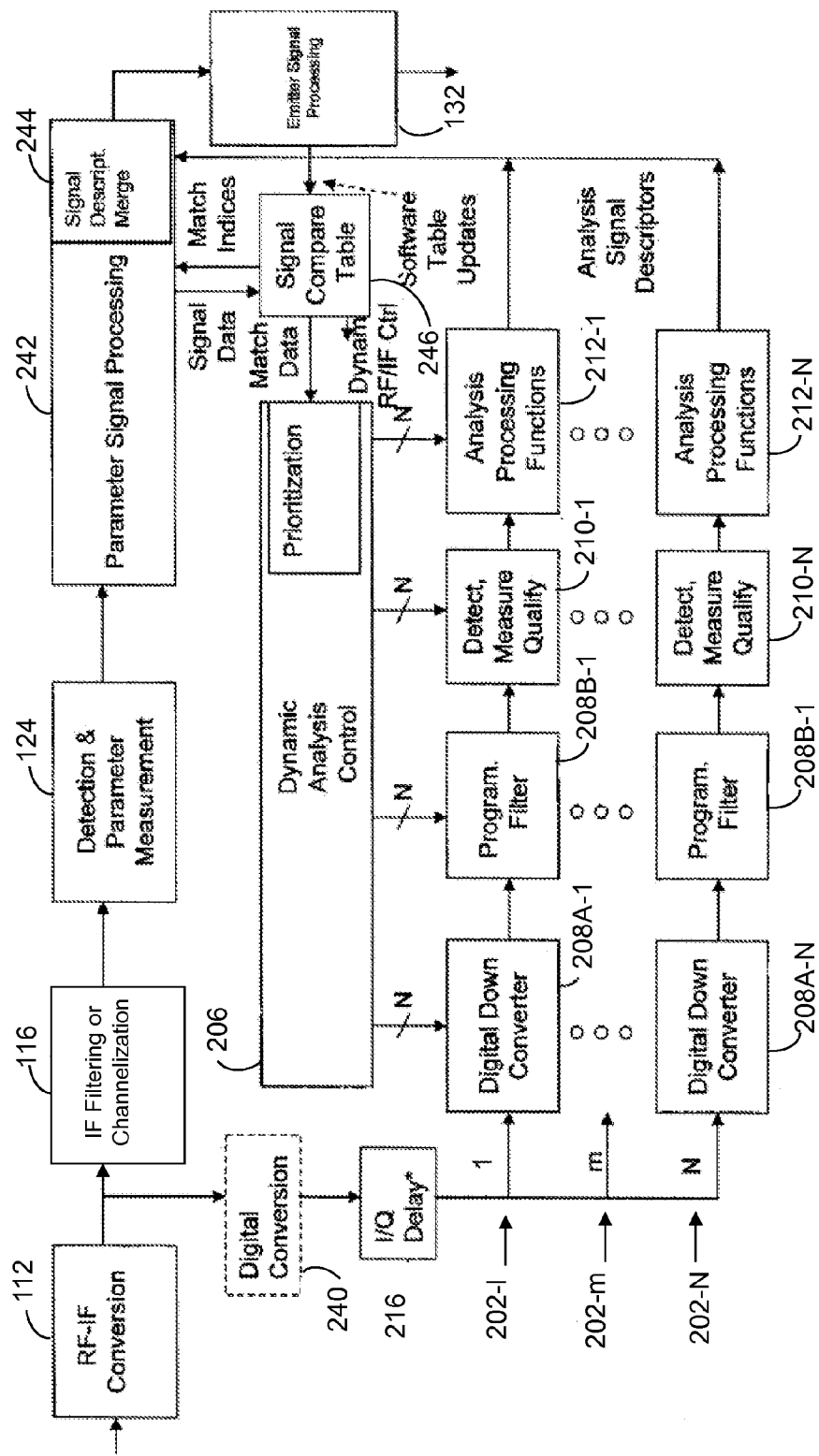

In accordance with some embodiments of such a system, such as indicated in FIG. 2A (200), one or more dynamic analysis receiver channels 202 may be included as an alternative to the analysis filter 120, which dynamic analysis receiver channels can be digitally tuned over the range of the complete wideband channelizer 116. Furthermore, such a dynamic analysis receiver channel 202 may include one or more programmable detection filters 208 which can be re-configured dynamically, based upon the signal environment that is detected.

As illustrated, this embodiment consists of a number of the prior art elements of FIG. 1 combined with a dynamic analysis receiver channel 202 in conjunction with a dynamic analysis control unit or module 206. In addition, this embodiment includes an augmentation of the reacquisition table 136 to include (or be associated) with table entries comprising dynamic analysis fields 204 and thus forming a re-named re-acquisition/trigger table 136'. Such dynamic analysis fields are may be "tagged onto" descriptors of received signals, to indicate how those descriptors should be analyzed, and may be incorporated into or simply associated with the entries in the re-acquisition/trigger table.

Although a single instance of each of the dynamic analysis receiver channel 202 and control unit 206 is depicted, it should be appreciated that embodiments are not limited in this respect, and the inventive concepts can be used in system configurations in which any number of instances of any of these components can be employed.

The dynamic wideband signal acquisition system 200 includes a primary, front end 112, which is used to monitor a wide frequency range for signals of interest and down-convert them to an IF range to facilitate processing. Such signals may be acquired by any suitable means (e.g., by configuring one or more antennas 102).

The output from the front end 112 may feed a channelizer and/or filter bank 116, to isolate any signals of interest within filter bands. The channelizer's range may, however, be limited to a small portion or block of the monitored wide frequency range. Consequently, the front end 112 would need to be retuned, block by block, in order for the channelizer 116 to accommodate the entire range of the wide band to be monitored. The channelizer 116 takes the output from the front end and provides a set of corresponding outputs (e.g., one per channel) in parallel.

In addition to being applied to the channelizer 116, the (or an) output of front end 112 is also passed along to the analysis channel 202 (e.g., via optional I/Q delay stage 216), so that the received signal can be digitized by extracting the I/Q data associated with the received signal. An optional wideband signal delay memory 216 may be implemented in order to store the wideband I/Q samples in order to allow the narrowband detection/analysis channels to be able to process a signal/pulse that has already been detected in the wideband channel. The use of such a delay stage 216 may be avoidable as there is an inherent delay as the signal travels through the various blocks of the primary wideband receiver before the dynamic analysis channel may be utilized for that particular signal, and the inherent delay may suffice.

A processor (not shown here) performs a detect and measure algorithm 124 on each output of channelizer 116. Such algorithms include, but are not limited to, determining whether any energy is present in the channel, and if so, measuring its basic characteristics (e.g., its frequency, amplitude). Such algorithms can be implemented in any suitable way (e.g., via software or hardware or a combination). The result of the detect and measure process is the formation of a set of descriptors characterizing the channelizer outputs, with each descriptor corresponding to an associated one of the outputs of channelizer 116. Each descriptor is then provided (figuratively indicated by lines 125, to a "signal sort and cluster" module 128. Module 128 (which also may be implemented in hardware, software or a combination) performs an initial filtering or qualification of the descriptors, to identify and keep those descriptors that it deems to represent "good" signals, and it may discard the rest. The signal sort and cluster module 128 then appends to each saved descriptor additional analysis fields, thereby forming a set of "extended" descriptors. Initially, the values in these appended fields may be initialized to some default or "blank" setting.

These extended descriptors are then sent or appended to (i.e., acted upon by) a re-acquisition/trigger table 136. An emitter processing module 132, which is typically a programmed processor, inspects the extended descriptors to determine if there is a match between an extended descriptor from the signal sort and cluster module and the prior entries in the re-acquisition/trigger table. If for a given extended descriptor from the signal sort and cluster module there is no match, then the extended descriptor is processed by the signal sort and cluster module 128 where signal sort and cluster algorithms are applied, as described in connection with FIG. 1.

If any matching signals are found between the new extended descriptor and the re-acquisition/trigger table 136' entries, then the appended descriptor analysis fields are filled in with values corresponding to the matching table entry(ies).

Each re-acquisition/trigger table 136' entry further comprises dynamic analysis fields 204, which are associated with the descriptors of acquired signals, to describe to the dynamic analysis channel how an acquired signals is to be analyzed. For example, the dynamic analysis fields 204 may indicate that only a certain set of functions is to be applied to a particular descriptor.

The dynamic analysis control module 206 receives on line 230 the extended descriptor and associated dynamic analysis fields, and determines what processing is specified by the content of the dynamic analysis fields. For example, in some instances, the content of a dynamic analysis field may signal that the antenna(s) should be re-configured, to assess the direction of the transmitter relative to the receiver. The dynamic analysis control module then signals receiver control 104 via path 224 and receiver control 104 instructs antenna selection unit 108 to make the appropriate reconfiguring change to antennas 102.

In another typical instance, the updated extended descriptors may be sent back to the signal sort and cluster module 128, where the sorting and clustering algorithms are applied, utilizing any match indices that may have been added in the extended descriptor fields. As before, emitter processing module 132 makes a determination as to what types of signals have been observed and their characteristics. However, this process is more efficient than that of the prior-art system of FIG. 1 due to the additional information provided by the match indices.

Alternatively, the dynamic analysis fields 204 corresponding to a matching descriptor may indicate that further dynamic analysis on the associated signal is required. In that case, the updated extended descriptors are sent to the dynamic analysis control 206 via path 230 to configure the dynamic analysis channel. If necessary, the dynamic analysis control module 206 may also instruct the receiver control 104 via path 224 to halt any ongoing or further activity while the dynamic analysis channel performs its requisite digital tuning and/or subsequent analysis.

The dynamic analysis channel 202 includes as past of module 208 a digital down converter for down-converting the delayed I/Q signals (from delay 216, if present), to facilitate processing. The down converter includes at least one tunable filter. The digital down converter 208 uses the I/Q data outputted from the front end 112 to dynamically and digitally tune the programmable detection filter(s) also contained in module 208. The operation of the dynamic down converter also is controlled in part by the dynamic analysis control module 206. Thus, the dynamic analysis control module 206 may send relevant dynamic analysis fields 204, corresponding to the matching descriptor, to the digital down converter 208 to (dynamically) retune an associated programmable filter(s) in the down converter using appropriate bandwidth and filter parameters (specified in the dynamic analysis fields) necessary to perform the analysis.

The output of this filter is then sent to the detect, measure, and qualify component 210 (which may be implemented in hardware, software, or a combination) which verifies that the signal is indeed there, and that it does match the characteristics that were noted in the re-acquisition/trigger table 136'. If so, the detect, measure, and qualify component 210 generates an appropriate descriptor and sends the associated signal's I/Q data to the analysis functions component 212, which does an in-depth analysis on the signal. The type of analysis algorithms that are used for a particular descriptor are preferably determined at least in part by the type of signal and/or any relevant entries stored in the dynamic analysis fields (e.g., algorithm index), and may be pre-determined by the system designer. The results of the analysis are then appended to the descriptor and sent back to the signal sort and cluster module 128, which reports to emitter processing module 132. With the additional analysis data appended to the descriptor, emitter processing module 132 is able to more efficiently identify the signal than it could in the prior art implementation of FIG. 1.

It should be appreciated that the various components of the dynamic analysis channel (208, 210, 212), the dynamic analysis control 206, and the dynamic analysis fields 204 can be implemented in any suitable way (e.g., via software executing on one or more programmable processors, or in hardware such as field programmable gate arrays, FPGAs, or application-specific integrated circuits, ASICs, or in some combination; the term "processor" is used herein to refer, therefor, as a generic term encompassing any information processing element unless there is an explicit or implicit limitation to a programmable or programmed processor distinct from a hardware processor such as an FPGA or ASIC). Furthermore, one or more such dynamic analysis channels could be used in conjunction with one or more fixed analysis channels (as described, for example relative to FIG. 1). The number of dynamic analysis channels and/or fixed analysis channels used is not a limitation.

FIG. 2B provides another functional block diagram of an example of a system and method for practicing many of the same concepts as were explained in connection with FIG. 2A. This example is largely a duplication of FIG. 2A, slightly re-cast to illustrate (a) multiple instantiations of analysis channel 202, shown as 202-1-202-N. To highlight that the wideband IF signal output by front end 112 may be either analog or digital, an optional analog-to-digital converter 240 has been shown in the signal path to the I/Q delay stage 216. If the wideband IF is analog, the converter 240 would be used. If the IF is digital, the converter may be omitted. The digital down converter/program detection filter 208 of FIG. 2A has been shown as a separate digital down converter 208A and a separate program filter 208B. The signal sort and cluster module 128 has been replaced by a parameter signal processing module 242, which includes a signal descriptor merge component 244. Module 242 and component 244 perform the functions of signal sort and cluster module 128 as well as the merging the signal descriptors from module 124 with match indices from a signal compare table 246, which combines re-acquisition/trigger table 136' and dynamic analysis fields 204. The receiver control and antenna selection unit of FIG. 2A are omitted for simplification but typically would also be employed.

There are several a priori steps which may occur before operation of the system of FIG. 2A or 2B. For example, the acquisition and analysis rules for a number of types of signals, and even for specific signals from specific transmitters (emitters) may be initialized and/or pre-determined using known intelligence. The flowchart of FIG. 3 describes how, for each emitter in a candidate list, an operational signal library may be generated comprising a set of "seed" entries which may be recorded in the re-acquisition/trigger table 136' and used to populate at least a starting set of dynamic analysis fields 204.

Signal Intelligence Flow

An example of an a priori signal intelligence flow 300 to generate an operational signal library 312 may begin by retrieving a signal (or signal mode) from a candidate list of emitters (Step 302). For example, such a list may be a catalog of known transmitters in a geographical and frequency region of interest, such as all the weather radars, all the air traffic control radars, all the navigation radars of the commercial ships based in the area, etc. Available signal intelligence data on such emitters may be gathered from any suitable sources (Step 304). This data may in turn be used to determine such acquisition detection rules as detection bandwidths, signal re-visit time, acquisition duration or dwell time, and/or acquisition match (ID) parameters (Step 306). Additionally, such data may be used to determine parameters and methods required for detailed signal analysis to distinguish a specific emitter (e.g., analysis bandwidth, analysis (dwell) time, filter characteristics, detection criteria, demodulation, and/or processing algorithms) (Step 308). This process may be repeated for each signal on the candidate list (Step 310), culminating in the generation of an operational signal library (Step 312) that includes what analysis should be performed when a particular signal is observed. The system 200 (e.g., the re-acquisition/trigger table 136' and dynamic analysis fields 204) will then gain access to this library at runtime. (Of course, it may also augment the library dynamically).

Signal/Emitter Library Generation

Figure 4:
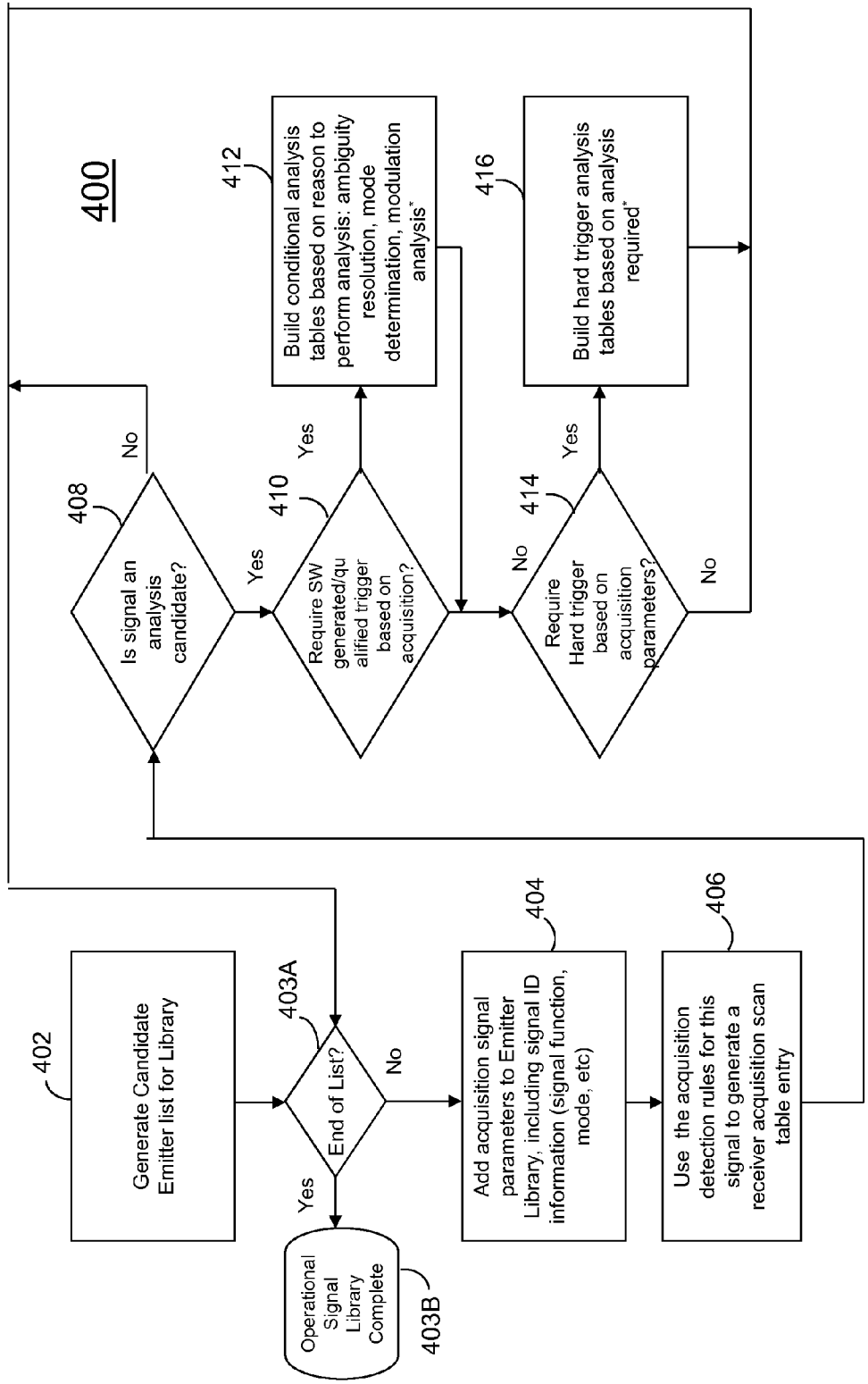
FIG. 4 is a flowchart describing an example of a priori collation of signals into an emitter (i.e., transmitter) library and generation of an acquisition scan table.

FIG. 4 is a flowchart describing a process 400 by which, for each emitter in a candidate list, the signals may be collated into an emitter library and an acquisition scan table may be generated, according to some embodiments of the invention. In particular, for each signal on a candidate emitter list (402), acquisition signal parameters, including signal ID information (e.g., signal function, mode, etc.) are obtained and added to an emitter library accessible to emitter processing module 132, Step 404, until the candidate emitter list has been exhausted (Step 403A) and the operational signal library is thus complete (Step 403B).

Figure 3:
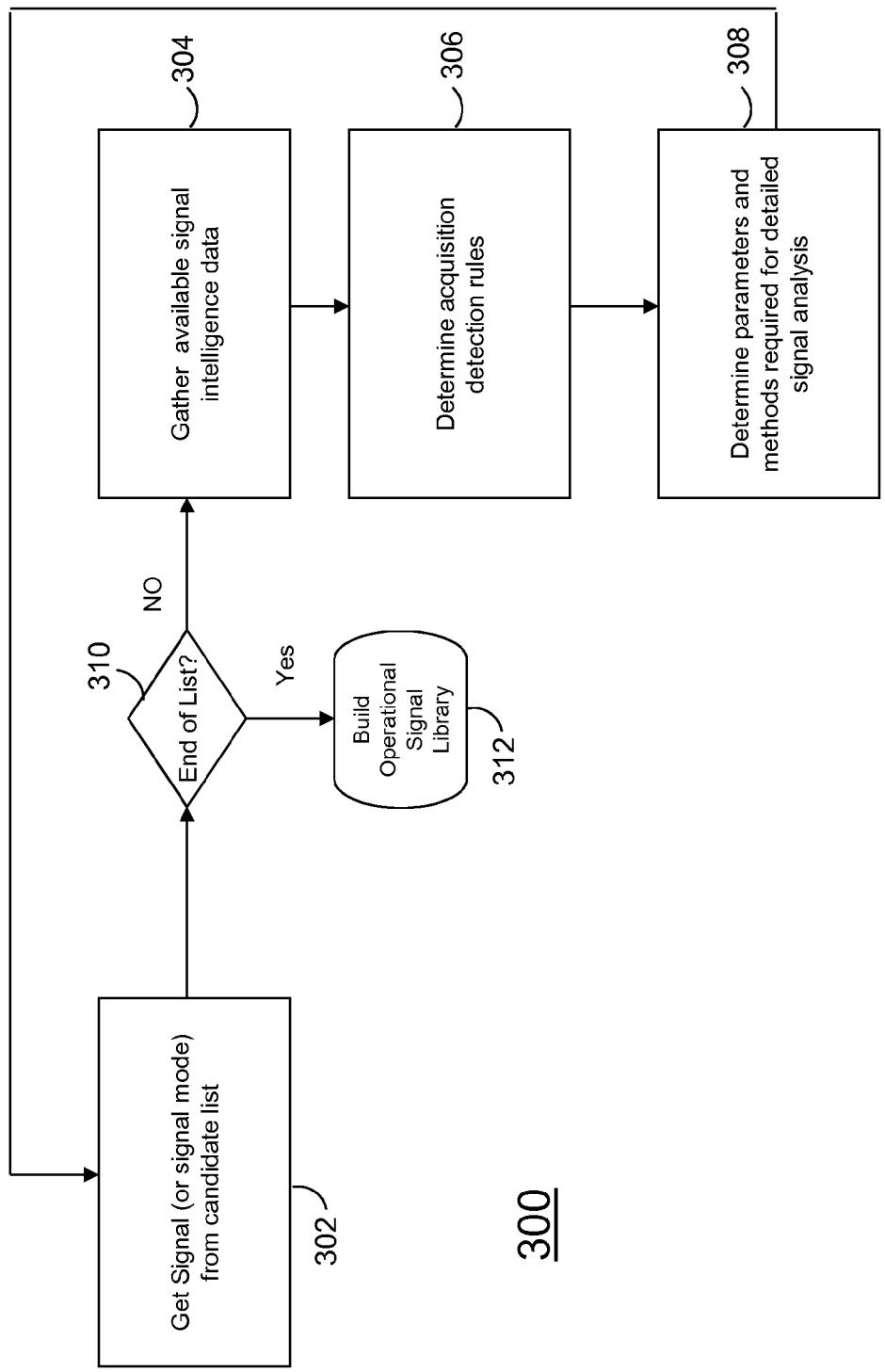
FIG. 3 is a flowchart describing an example of an a priori signal intelligence flow which may be used to build an operational signal library, according to some disclosed embodiments.

Using the acquisition detection rules determined in step 306 of FIG. 3 for each signal, a receiver acquisition scan table entry is generated (Step 406).

If the signal is not an analysis candidate (because it is not of interest or it is positively identified) (as tested in Step 408), the process (400) proceeds to evaluating the next signal on the candidate emitter list (see Step 403A). Otherwise, if it is determined that the signal is a candidate for analysis, some preliminary screening may be performed (Steps 410, 412) to determine the kind of analysis. A software-generated/qualified trigger may be required based on the acquisition scan table entry (Step 410), in which event conditional analysis tables are built based on the reason for performing the analysis (e.g., ambiguity resolution, mode determination, modulation analysis) (Step 412). Additionally, if a hard trigger is required based on the signal's acquisition parameters (Step 414), then hard trigger analysis tables are built based on the analysis required (Step 416). Such hard trigger tables would be made accessible to and may become part of the re-acquisition/trigger table 136'.

Run-Time Set-Up.

Figure 5:
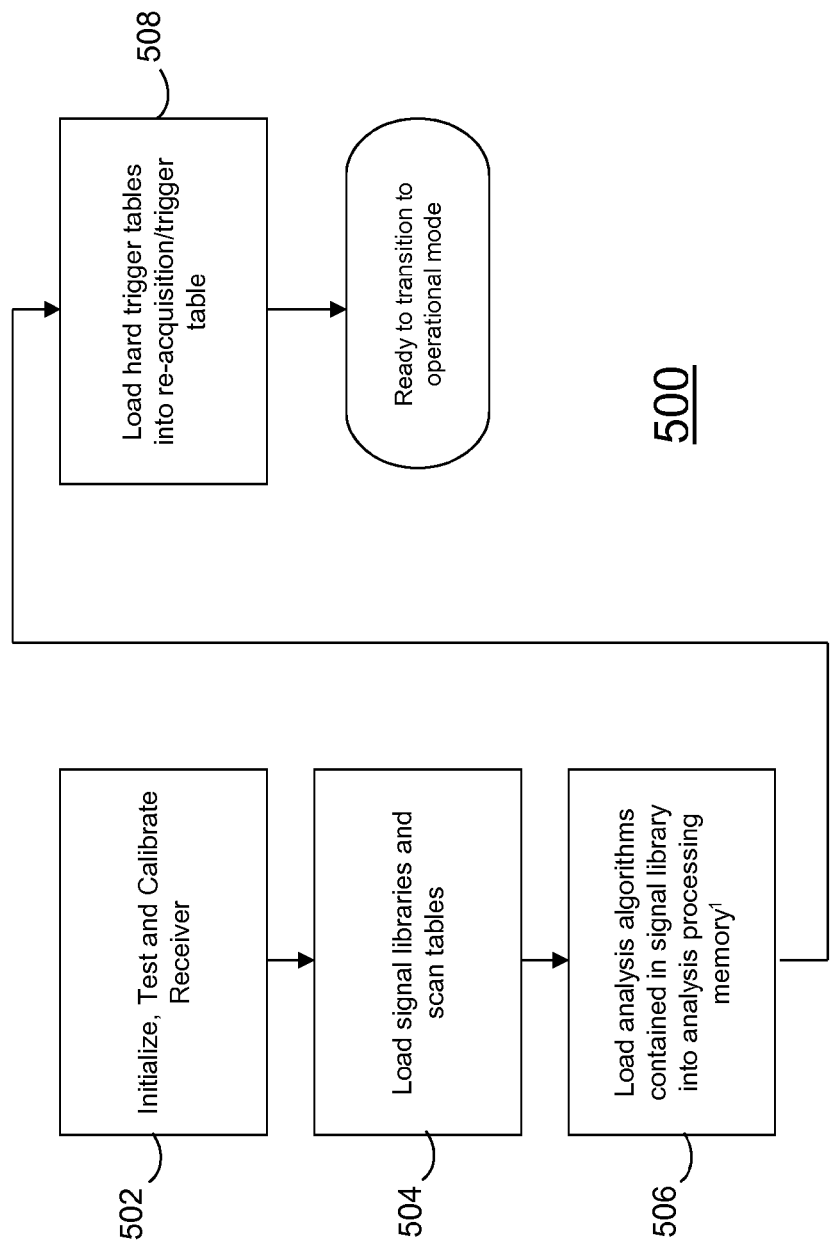
FIG. 5 is a flowchart describing a process by which the receiver may be initialized, libraries and algorithms may be loaded, and tables may be initialized.

The processes of FIGS. 3 and 4 provide tables which seed the system 200 with initial information about potential transmitters from which signals can be received. In the flowchart of FIG. 5, a process 500 is presented by which the receiver is initialized, libraries and algorithms are loaded, and tables are initialized, according to some embodiments of the invention. Once this set-up process is complete, the system is ready to be used to identify signals in the band being monitored.

In step 502, the receiver preferably is initialized, tested, and calibrated, which is a conventional routine. Then, signal libraries and scan tables that were established in the a priori steps described in FIGS. 3-4 are loaded into memory provided for them (Step 504). Analysis algorithms contained in an operational signal library also may be loaded into a memory, the analysis processing memory, Step 506, for speed of access by the system. Some commonly required algorithms may already be burned in the receiver's non-volatile memory, in FPGAs, or in ASICs. Hard trigger tables are loaded into the re-acquisition/trigger table 136' (Step 508). Upon completion of these steps (502-508), the system 200 is ready to transition into operational mode.

Run-Time Operation.

Figure 6:
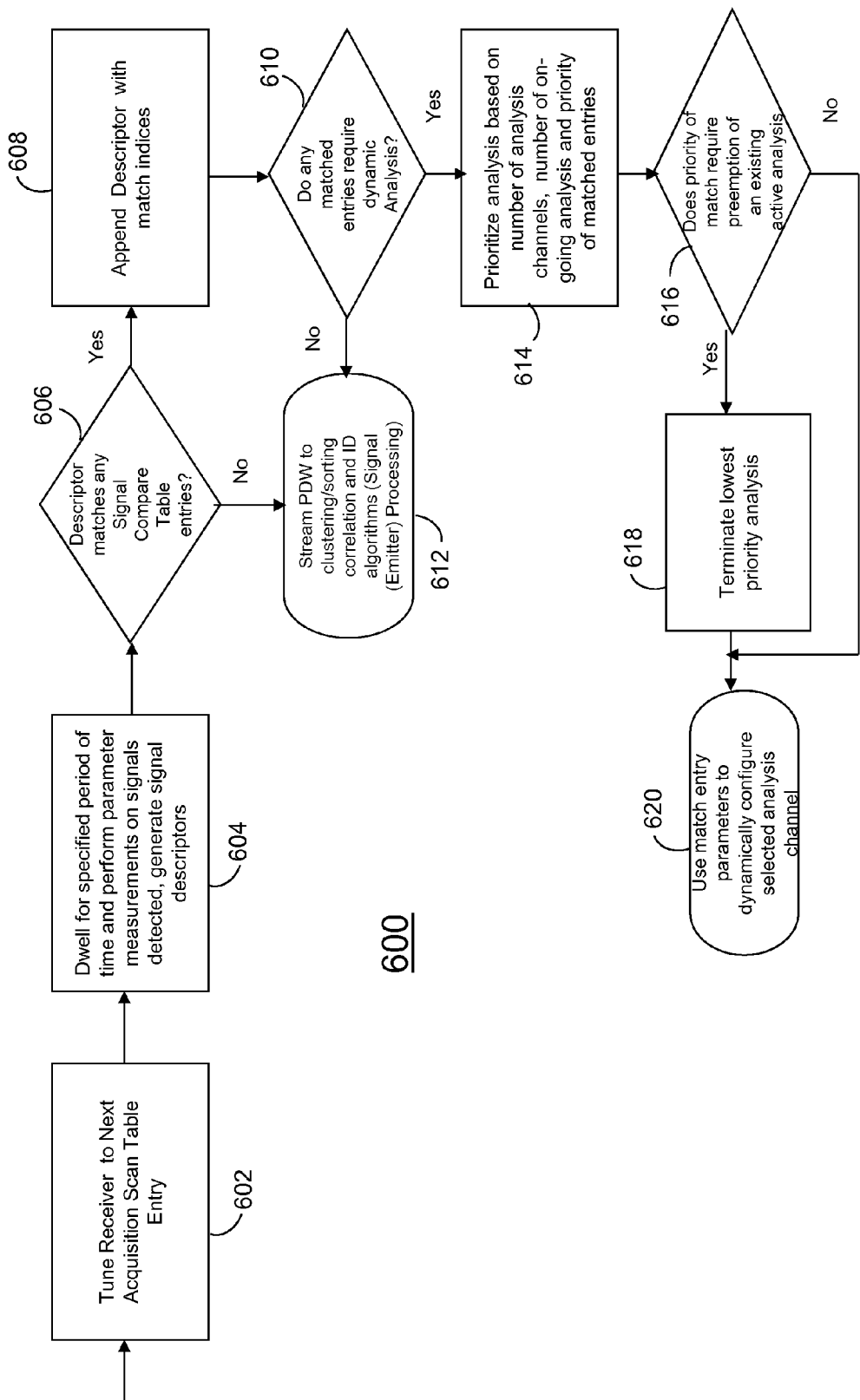
FIG. 6 is a flowchart describing an example of a receiver acquisition tuning and processes.

In FIG. 6, an example of the receiver acquisition tuning and processes is described. In step 602, the receiver is tuned to the next entry in the acquisition scan table. The receiver dwells for a specified time period, performs parameter measurements on detected signals, and generates descriptors (Step 604). If a descriptor does not match an entry in the re-acquisition/trigger table, then the appropriate signal sort and cluster algorithms are applied, the descriptor is augmented by analysis functions 212 and the augmented descriptor is sent to emitter processing module 132 for identification.

If a descriptor does match one or more entries in the re-acquisition/trigger table (Step 606), then the descriptor is appended with indices corresponding to the matching entries (Step 608). If the matching entries indicate that dynamic analysis is not required (Step 610), then the appropriate signal sort and cluster algorithms in module 128 are applied to the extended descriptor and it is sent to emitter processing module 132 for identification (Step 612). On the other hand, if further dynamic analysis is required (Step 610), then analysis is prioritized based at least upon the number of analysis channels, the number of ongoing analyses, and a priority assigned to the matched descriptor (Step 614). If the priority of the matched descriptor requires pre-emption of an existing active analysis (Step 616), then the lowest priority analysis is terminated (Step 618). Then the re-acquisition/trigger table and dynamic analysis field entries associated with the matched descriptor are used to dynamically configure the selected analysis channel (620).

Dynamic Analysis Operation

Figure 7:
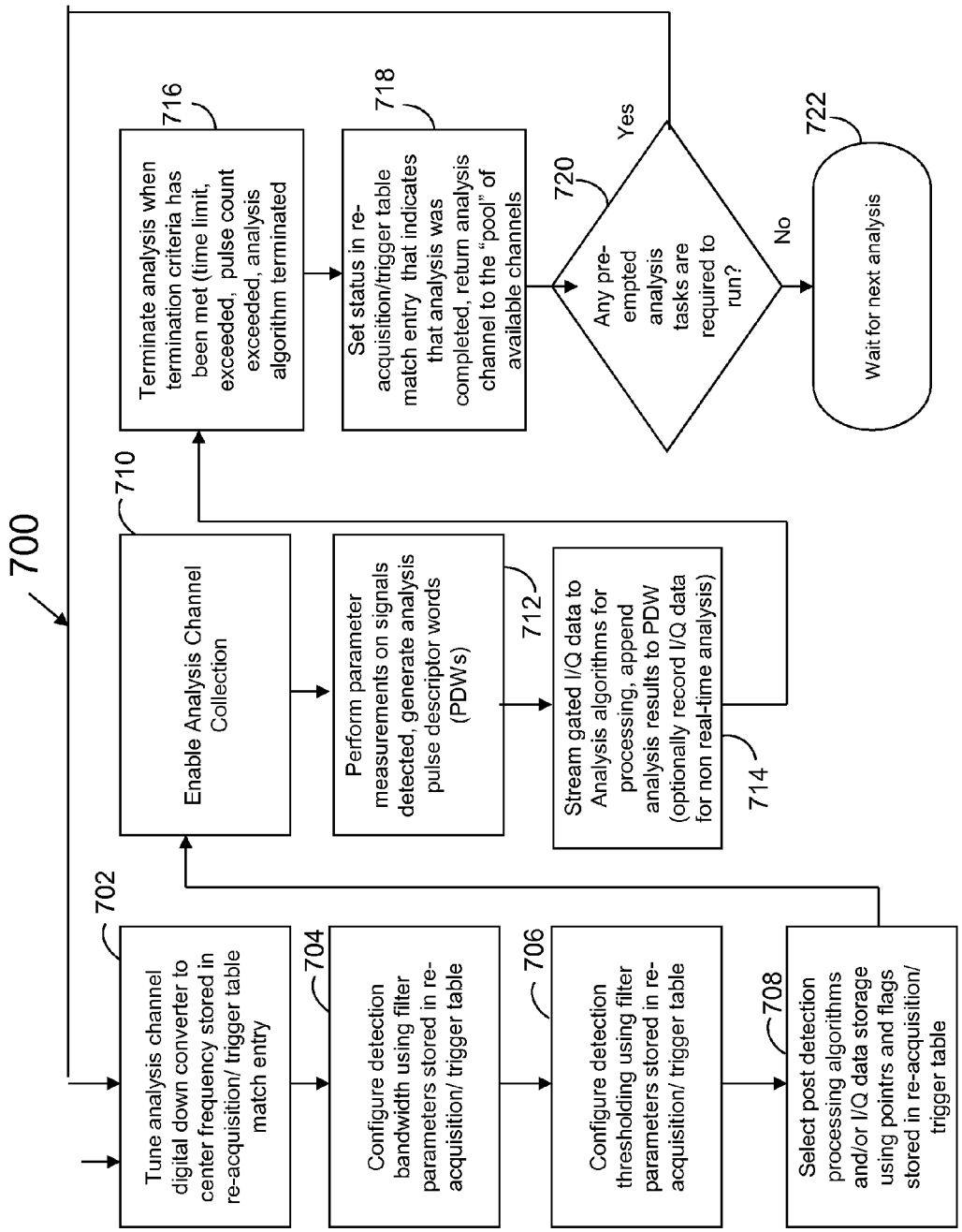
FIG. 7 is a flowchart describing an example of a dynamic analysis operation as taught herein.

FIG. 7 is a flowchart describing an example process 700 of a dynamic analysis operation, according to some embodiments. In step 702, the dynamic analysis control module 206 instructs the analysis channel's digital down converter/programmable filter 208 to tune to a center frequency stored in the matching entry of the re-acquisition/trigger table 136'. The dynamic analysis control 206 also configures the detection bandwidth (in digital down converter/programmable filter component 208) (Step 704) and a detection threshold value (in detect, measure, qualify component 210) (Step 706) using filter parameters stored in the re-acquisition/trigger table 136'. Selection of the post detection processing algorithms and/or I/Q data storage using pointers and flags stored in the re-acquisition/trigger table 136' is done by appropriate configuration of the analysis functions component 212 by the dynamic analysis control module 206 (Step 708). Then, analysis channel collection is enabled (Step 710). The detect, measure, and qualify component 210 performs parameter measurements on signals detected and generates analysis descriptors (Step 712). I/Q data for the descriptors is sent to the analysis functions component 212 for application of the appropriate analysis algorithms. The analysis results are appended to the descriptors and sent to the signal sort and cluster module 128 (Step 714). The dynamic analysis control module 206 will terminate analysis when some termination criteria has been met (e.g., time limit exceeded, pulse count exceeded, analysis algorithm terminated) (Step 716). The dynamic analysis control module 206 will then set some status bit(s) in the re-acquisition/trigger table 136' match entry that indicates that analysis was completed, and that the analysis channel is now available for future dynamic analysis requests (Step 718). If any previous analysis tasks had been pre-empted to facilitate the just finished task, then those previous tasks are now resumed (Step 720). Otherwise, the dynamic analysis control will wait for the next analysis request (Step 722).

Emitter Processing

Figure 8:
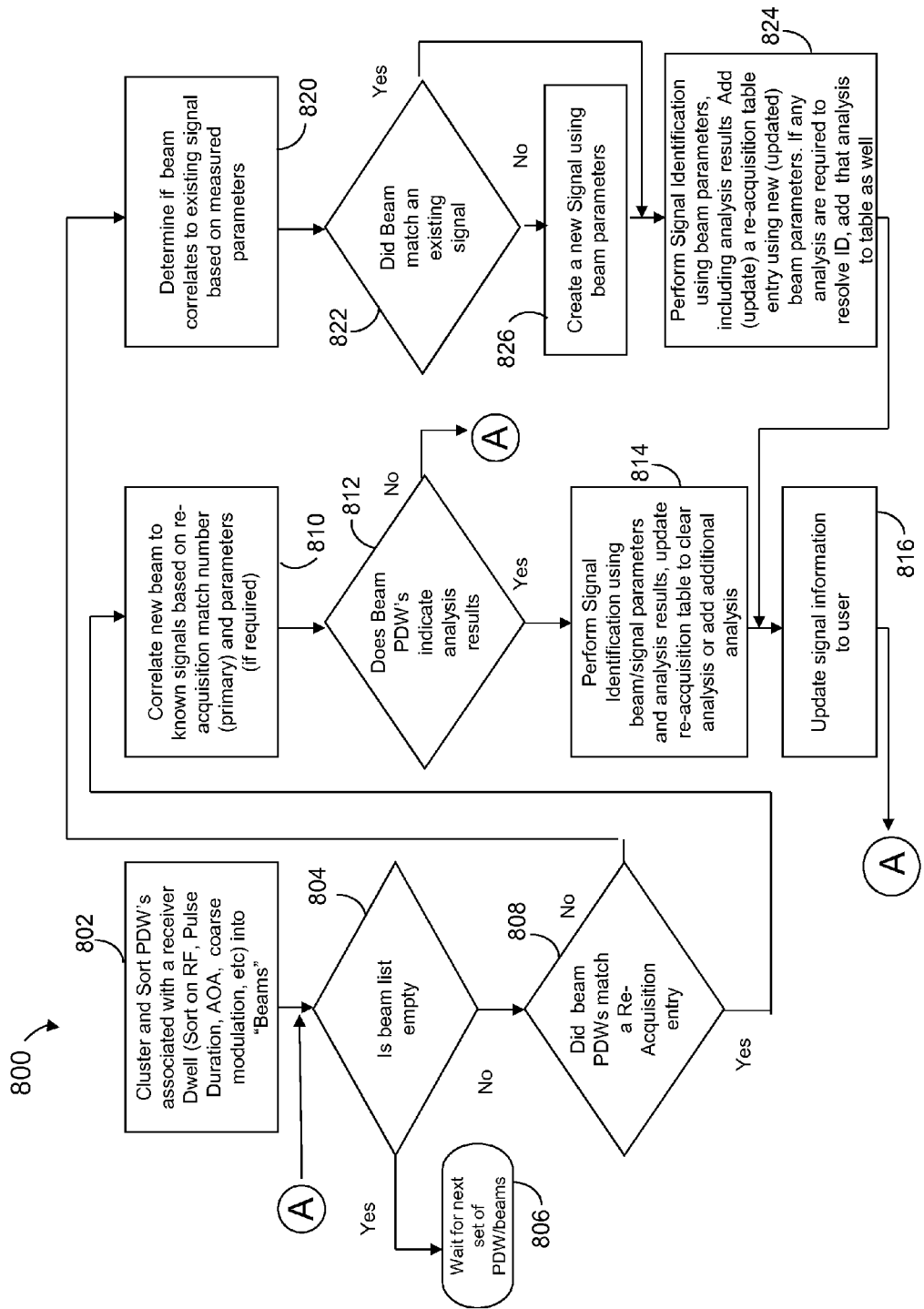
FIG. 8 is a flowchart describing an example of emitter processing and reporting operations, according to some embodiments taught herein.

FIG. 8 is a flowchart describing an example flow 800 of emitter processing and reporting operations, according to some embodiments.

In step 802, the signal sort and cluster component 128 preferably clusters and sorts descriptors associated with a particular time window or dwell of the receiver into "beams". A "beam" is considered to be one or more related signals, such as multiple pulses from a common emitter. (A descriptor may be generated for any beam, including one pertaining to multiple signals.) If the beam list is empty (Step 804), emitter processing module 132 waits for the next set of descriptors or beams (Step 806). Otherwise if the beam descriptor matches a re-acquisition/trigger table entry (Step 808), then a new beam is correlated to known signals based on the re-acquisition match number and parameters (Step 810). If the beam descriptors indicate analysis results (Step 812), then signal identification is performed using the beam/signal parameters and analysis results. In addition, the reacquisition/trigger table is updated to either clear the analysis or add additional analysis (Step 814). The signal information to the user is updated, and the process is repeated for the next beam (Step 816).

If, on the other hand, the beam descriptor does not match a re-acquisition/trigger table entry (Step 808), then a determination is made as to whether the beam correlates to an existing signal based on measure parameters (Step 820). If the beam matches an existing signal (Step 822), then signal identification is performed using beam parameters and the analysis results (Step 824). A re-acquisition/trigger table entry is then added or updated using the new, updated beam parameters. If any analysis is required to resolve the identification, then that analysis is added to the re-acquisition/trigger table as well (Step 824).

Alternatively, if the beam does not match an existing signal (Step 822), a new signal is created using beam parameters (Step 826). Then signal identification proceeds as was just discussed (Step 824). The signal information to the user is updated, and the process is repeated for the next beam (Step 816).

FIG. 9 is a table defining an example of a selection of parameter fields that could be included within the re-acquisition/trigger table 136' and/or its associated dynamic analysis fields 204, providing a brief statement of the name and function of each field. It should be appreciated that the table entries depicted are only examples, and the invention is neither limited nor restricted to using such entries. The order of entries is also not intended to be limiting.

Figure 10:
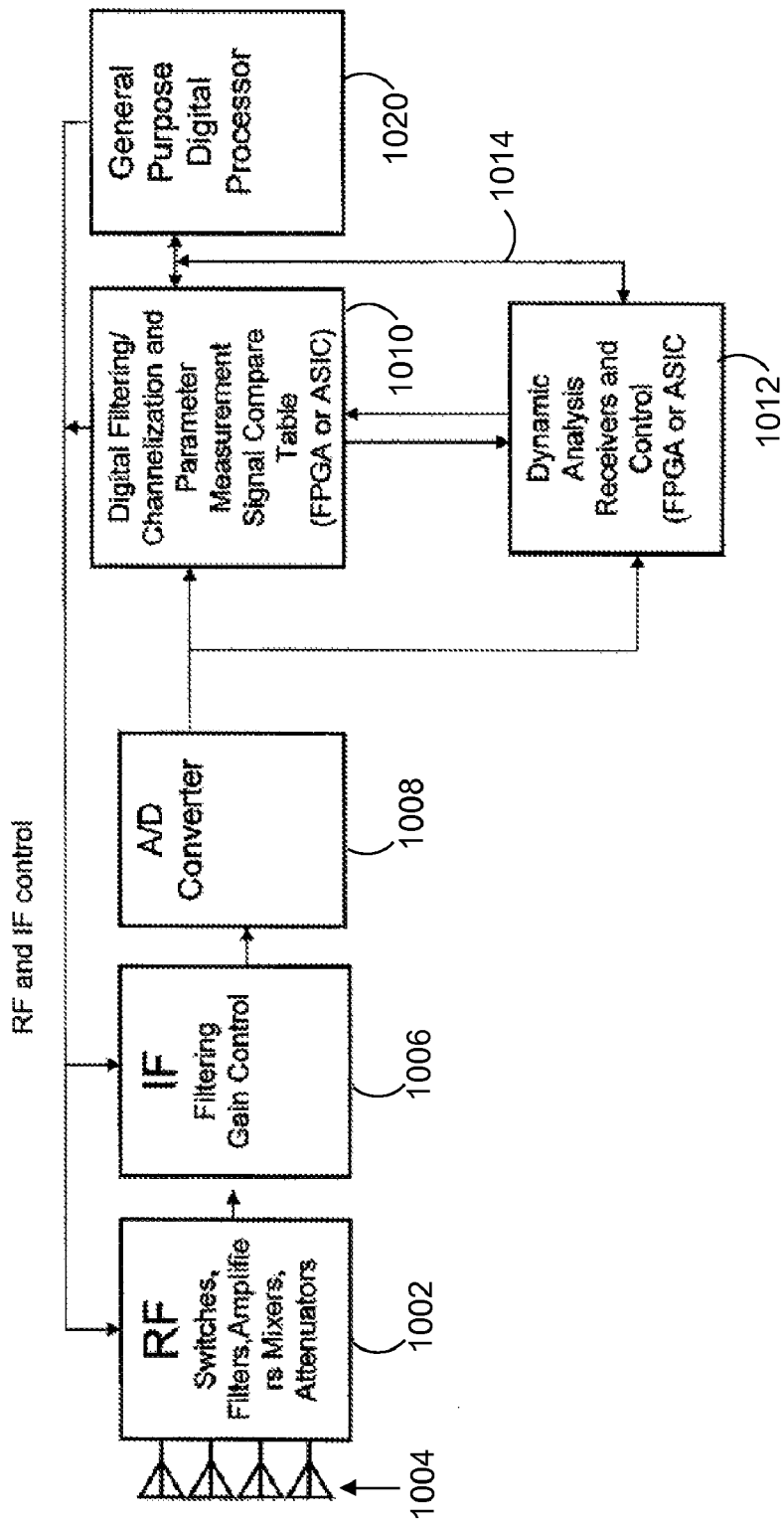
FIG. 10 is a block diagram of a hardware implementation of a system as disclosed herein, wherein IF processing is done in the digital domain.

As stated above in connection with the discussion of FIG. 2B, the IF signals may be analog or digital. While functionally there is little difference, hardware implementations will, of course, need to be different in those two cases. To illustrate, FIGS. 10 and 11 provide block diagrams of example hardware implementations for a digital IF (FIG. 10) and an analog IF (FIG. 11) adapted from the functional diagrams of FIGS. 2A and 2B.

The digital system is simpler to illustrate, for FIG. 10 will be discussed first. There, a front end 1002 is connected to antennas 1004 and to down convert the received signals to an IF band. The IF output of the front end undergoes some basic band-pass filtering and gain control in an initial IF stage 1006. The "cleaned up" IF signal output from stage 1006 is sampled by an analog-to-digital (A/D) converter 1008, which provides I and Q output samples. The digital IF samples are supplied to and processed by two hardware processors: (1) a first ASIC or FPGA 1010 which performs the functions of digital filtering/channelization, parameter detection and measurement, and parameter signal processing; and (2) a second ASIC or FPGA 1012 which provides the dynamic analysis channels. For simplicity of presentation, the memory containing the signal comparison tables (i.e., re-acquisition/trigger table, etc.) is subsumed into processor 1010 as the memory preferably is on the same chip or in the same multi-chip package. The processors 1010 and 1012 intercommunicate via a bus 1014 (e.g., a RocketIO, VME or FibreChannel or any other suitable bus) and via the same bus with a general purpose digital processor 1020, which may be programmed as the emitter processing module 132, and for any other desired function.

Figure 11:
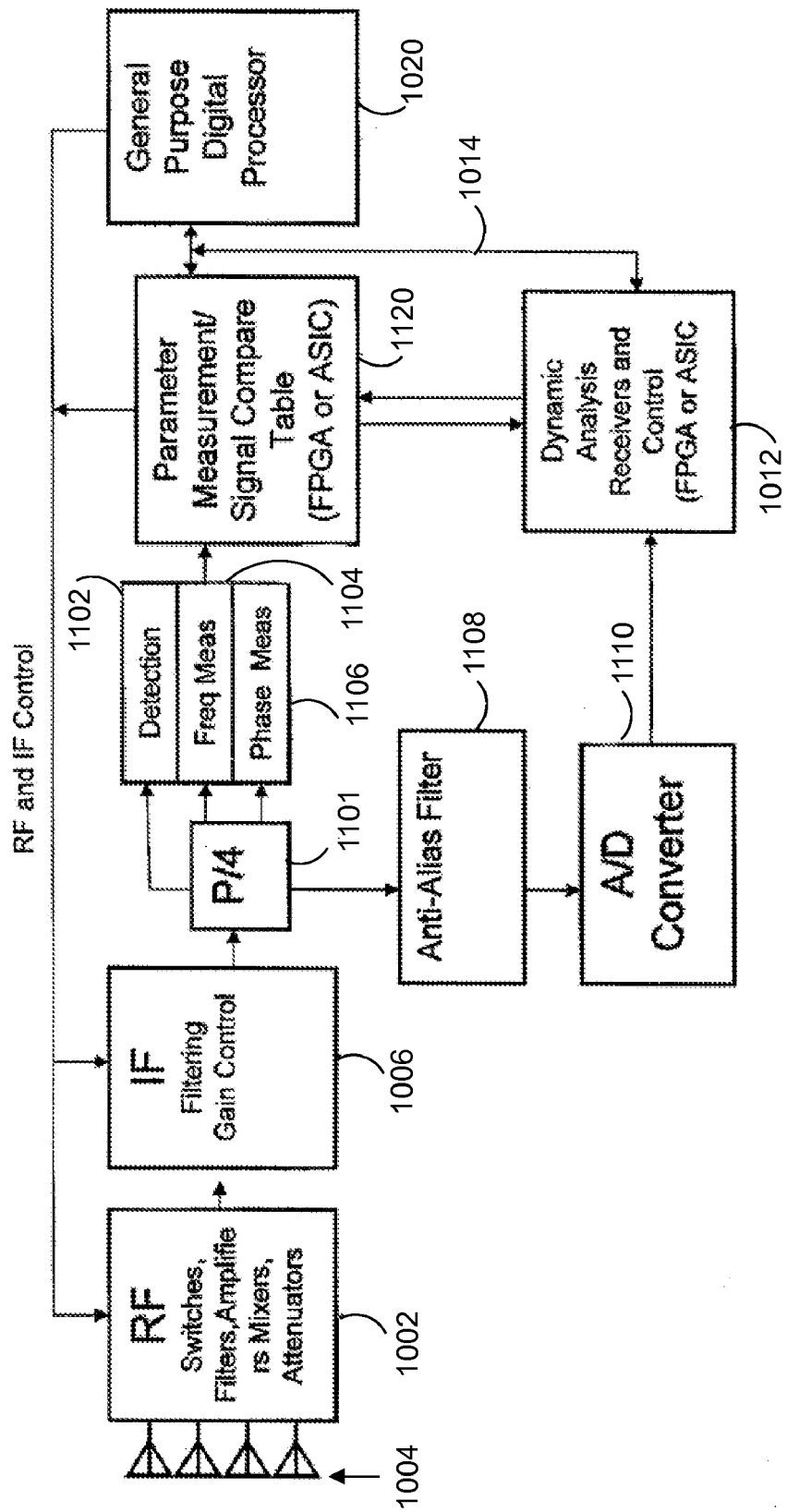
FIG. 11 is a block diagram of a hardware implementation of a system as disclosed herein, wherein IF processing is done in the analog domain.

Turning to FIG. 11, the output of initial IF stage 1006 is channelized at 1101 (into, e.g., four channels) and in the analog domain, the received signals are detected and their frequency and phase are measured in circuits 1102-1106, respectively, which preferably provide digital outputs. The output of initial IF stage 1006 is also passed through an anti-aliasing filter 1108 and the resulting band-limited analog IF signal is sampled by A/D converter 1110 to form I and Q samples on output 1110 to an ASIC or FPGA 1012, which provides the dynamic analysis channels. Another ASIC or FPGA 1120 need only provide the parameter measurement, and parameter signal processing roles of processor 1010 of FIG. 10 as circuits 1102-1106 provide the remainder of its functions.

The above-described embodiments are not exhaustive, and are only examples, as the inventive concepts can be implemented in any of numerous additional ways. For example, it has already been noted that the foregoing and other embodiments may be implemented using hardware, software or a combination thereof. When implemented in software, the software code can be executed on any suitable programmable processor or collection of processors, whether provided in a single computer or distributed among multiple computers.

If multiple computers are used, such computers may be interconnected by one or more buses or networks in any suitable form, including as a local area network or a wide area network, such as an enterprise network or the Internet. Such networks may be based on any suitable technology and may operate according to any suitable protocol and may include wireless networks, wired networks or fiber optic networks.

Also, many or all of the various methods or techniques outlined herein, or specific modules or components, may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, one or more aspects or modules or components may be embodied as a computer-readable medium (or multiple computer readable media) (e.g., a computer memory, one or more floppy discs, compact discs, optical discs, magnetic tapes, flash memories, circuit configurations in Field Programmable Gate Arrays, Application-Specific Integrated Circuits or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of methods and systems as discussed above.

The terms "program" or "software" are used herein in a generic sense to refer to any type of computer code or set of computer-executable instructions (including microcode) that can be employed to program a computer or other processor to implement various modules or functions as discussed above. Additionally, it should be appreciated that according to one aspect of this embodiment, one or more computer programs that when executed perform methods discussed above need not reside on a single computer or processor, but may be distributed in a modular fashion amongst a number of different computers or processors to implement various modules or components.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the disclosed systems and methods and their example embodiments be used alone, in combination, or in a variety of arrangements not specifically discussed in the embodiments described in the foregoing and is therefore not limited in its application to the details and arrangement of components set forth in the foregoing description or illustrated in the drawings. For example, aspects or modules or components described in one embodiment may be combined in any manner with those described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for processing received electromagnetic signals present in a first, wide band of frequencies comprising:
   down-converting said received electromagnetic signals to an intermediate frequency band;
   channelizing signals in the intermediate frequency band into a plurality of narrower band channels within said intermediate frequency band;
   inputting the intermediate frequency signals into a programmable narrowband filter;
   forming a set of original descriptors, with each original descriptor corresponding to an associated output signal of each of the plurality of channels and characterizing said output signal;
   storing the set of original descriptors in a computer-readable memory;
   in a processor, analyzing each original descriptor to determine if further processing is warranted according to predetermined criteria;
   for each original descriptor warranting further processing, selecting one or more corresponding analysis methods from a library of available analysis methods;
   based at least in part on the selected analysis methods, adjusting the programming of the programmable narrowband filter and forming a new descriptor of its output; and
   augmenting a corresponding stored original descriptor in said computer readable memory with the new descriptor, to form an augmented descriptor.

2. The method of claim 1 further comprising analyzing the augmented descriptor to determine if a received signal should be further processed.

3. The method of claim 1 further comprising analyzing the augmented descriptor to identify a corresponding signal emitter.

4. A system for processing electromagnetic signals present in a first, wide band of frequencies comprising:
   a programmable channelizer having a plurality of relatively narrow-band channels, each said channel passing signals only in a narrow pass band disposed within said wide band of frequencies, the channelizer receiving a representation of the signals received within the wide band of frequencies and each channel providing an output corresponding to input signals received within its pass band;
   a signal detection and parameter measurement module providing, responsive to the channelizer outputs, a set of descriptors, with each descriptor corresponding to an associated output signal of each of the plurality of channels and characterizing said channel's output signal;
   a signal comparison table configured to store descriptor entries along with indications of analysis methods to be applied to signals corresponding to said descriptor;
   a parameter signal processor operatively connected to analyze each descriptor of a received signal to determine if further processing of the signal is warranted according to predetermined criteria and for each signal warranting further processing, selecting one or more corresponding analysis methods to be applied to the signal corresponding to said descriptor;
   one or more dynamic analysis channels, each generating analysis signal descriptors for signals analyzed within the passband of a programmable narrowband filter, and including a dynamic analysis control module configured, based at least in part on the selected analysis methods, to adjust the programmable narrowband filter; and
   a processor configured to augment descriptor entries in the signal comparison table with information from analysis signal descriptors.

5. The system of claim 4, further including an emitter signal processing module operative connected to the signal comparison table to analyze said augmented descriptor entries to identify a corresponding signal emitter.

6. The system of claim 4 wherein the analysis methods applied to the descriptor are selected from a library of available analysis methods.

7. A receiver system for detecting and processing electromagnetic signals present in a first, wide band of frequencies comprising:
   a front end subsystem which down-converts received signals in said wide band of frequencies to an intermediate frequency band;
   an analog-to-digital converter operatively connected to the front end to produce digital samples of signals in the intermediate frequency band;
   a first hardware processor which receives said digital samples and is adapted to provide one or more dynamic analysis channels, each having at least one programmable narrowband filter and generating analysis signal descriptors for signals analyzed within the passband of each said programmable narrowband filter, and including a dynamic analysis control module configured, based at least in part on the selected analysis methods, to adjust the programmable narrowband filter;
   a programmable channelizer having a plurality of relatively narrow-band channels, each said channel passing signals only in a narrow pass band disposed within said intermediate frequency band, the channelizer receiving an intermediate frequency representation of the signals received and each channel providing an output corresponding to intermediate frequency signals within its pass band;
   means for obtaining signal measurements on signals output from said channels;
   a second hardware processor adapted to provide
   (i) a signal detection and parameter measurement module providing, responsive to the channelizer outputs, a set of descriptors, with each descriptor corresponding to an associated output signal of each of the plurality of channels and characterizing said channel's output signal, and (ii) a signal comparison table configured to store descriptor entries along with indications of analysis methods to be applied to signals corresponding to said descriptor; and one of said processors further being configured to augment descriptor entries in the signal comparison table with information from analysis signal descriptors.

8. The receiver system of claim 7 wherein each of the first and second hardware processors is embodied in an application-specific integrated circuit or a field-programmable gate array.

9. The receiver system of claim 7 further including an anti-aliasing filter, the analog-to-digital converter being operatively connected to the front end through the anti-aliasing filter.

10. The receiver system of claim 7 wherein the digital samples are also provided to the second hardware processor and the second hardware processor embodies the programmable channelizer and the means for obtaining signal measurements of signals output from said channels.

11. The receiver system of claim 7 further including an emitter signal processing module which analyzes said augmented descriptor entries to identify a corresponding signal emitter.

* * * * *